United States Patent
Schneider et al.

(10) Patent No.: US 9,103,439 B2
(45) Date of Patent: Aug. 11, 2015

(54) METHOD AND CONTROL DEVICE FOR RESOLVING A TOOTH-ON-TOOTH POSITION

(71) Applicant: ZF Friedrichshafen AG, Friedrichshafen (DE)

(72) Inventors: Florian Schneider, Lindenberg im Allgau (DE); Mario Steinborn, Friedrichshafen (DE); Thomas Jager, Mechenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/322,956

(22) Filed: Jul. 3, 2014

(65) Prior Publication Data
US 2015/0075307 A1    Mar. 19, 2015

(30) Foreign Application Priority Data
Sep. 13, 2013   (DE) .................. 10 2013 218 426

(51) Int. Cl.
| F16H 59/00 | (2006.01) |
| F16H 61/68 | (2006.01) |
| F16H 61/04 | (2006.01) |
| F16H 61/682 | (2006.01) |

(52) U.S. Cl.
CPC ............. *F16H 61/68* (2013.01); *F16H 61/04* (2013.01); *F16H 61/682* (2013.01); *F16H 2061/047* (2013.01)

(58) Field of Classification Search
USPC .................. 74/335; 701/67, 68; 477/174
See application file for complete search history.

(56) References Cited

U.S. PATENT DOCUMENTS

| 3,834,499 A  * | 9/1974 | Candellero et al. ............. 477/73 |
| 6,769,523 B2 * | 8/2004 | Muetzel et al. .............. 192/3.55 |
| 7,377,374 B2 * | 5/2008 | Buchhold .................... 192/3.55 |
| 7,827,876 B2 * | 11/2010 | Guggolz et al. ................ 74/335 |
| 7,945,366 B2 | 5/2011 | Bartels et al. |

(Continued)

FOREIGN PATENT DOCUMENTS

| DE | 10 2005 012 308 A1 | 9/2006 |
| DE | 10 2006 046 605 A1 | 4/2008 |

(Continued)

OTHER PUBLICATIONS

German Search Report Corresponding to 10 2013 218 426.3 mailed Apr. 25, 2014.

*Primary Examiner* — Ha D Ho
(74) *Attorney, Agent, or Firm* — Davis & Bujold, P.L.L.C.; Michael J. Bujold

(57) ABSTRACT

A method of eliminating a tooth-on-tooth position at an interlocking shifting element. The tooth-on-tooth position is eliminated by operating at least one actuator such that, during a first operating attempt the actuator is operated using a defined target parameter, after which it is checked whether as a result of the operation of the actuator the tooth-on-tooth position has been eliminated. If the tooth-on-tooth position is not eliminated, then repeating subsequent operating attempts of operation of the actuator, each time with an increased target parameter, until, after the corresponding operation of the actuator, the tooth-on-tooth position is eliminated by the m-th operating attempt. For elimination of a subsequent tooth-on-tooth position, the target parameter defined for the first elimination attempt is adapted such that the subsequent tooth-on-tooth position is eliminated by an n-th attempt.

12 Claims, 1 Drawing Sheet

(56) References Cited

U.S. PATENT DOCUMENTS

| | | |
|---|---|---|
| 8,070,652 B2 | 12/2011 | Doebele et al. |
| 8,452,503 B2 | 5/2013 | Bartels et al. |
| 2004/0118652 A1* | 6/2004 | Muetzel et al. ............. 192/3.55 |
| 2008/0109143 A1* | 5/2008 | Bartels et al. .................. 701/67 |

FOREIGN PATENT DOCUMENTS

| | | |
|---|---|---|
| DE | 10 2008 049 115 A1 | 4/2010 |
| EP | 1 572 491 B1 | 1/2008 |
| EP | 2 600 038 A2 | 6/2013 |

* cited by examiner

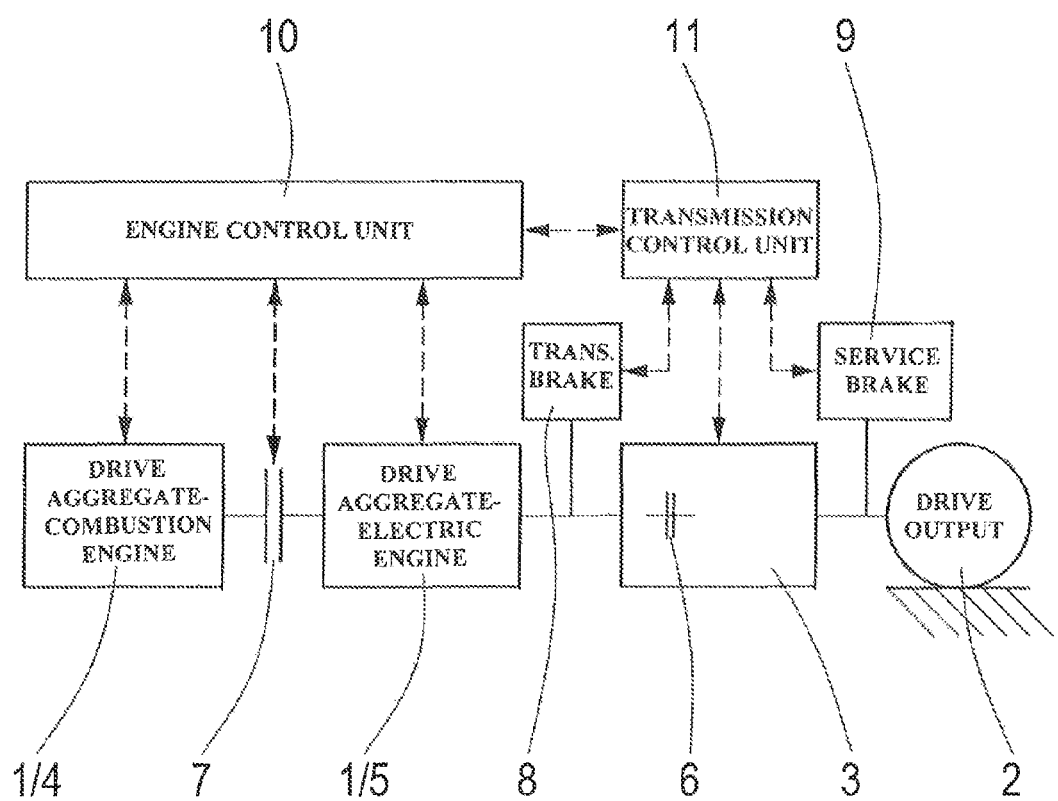

METHOD AND CONTROL DEVICE FOR RESOLVING A TOOTH-ON-TOOTH POSITION

This application claims priority from German patent application serial no. 10 2013 218 426.3 filed Sep. 13, 2013.

FIELD OF THE INVENTION

The invention concerns a method for eliminating a tooth-on-tooth position. Furthermore, the invention concerns a control unit for implementing the method.

BACKGROUND OF THE INVENTION

When a gearshift is carried out in an automated manual transmission, in which gearshift an interlocking shifting element is involved, and when the gearshift is carried out which involves an interlocking shifting element connected between two gear systems, tooth-on-tooth positions can occur at the interlocking shifting element which prevent the interlocking shifting element from closing. To carry out the gearshift such tooth-on-tooth positions have to be eliminated.

To eliminate such tooth-on-tooth positions at interlocking shifting elements, actuators are used. From the prior art various methods or procedures are known for eliminating a tooth-on-tooth position at an interlocking shifting element, these various methods or procedures differing in particular in the actuators involved in the tooth-on-tooth position.

For the elimination of a tooth-on-tooth position at an interlocking shifting element fundamentally conflicting criteria have to be fulfilled, namely on the one hand the elimination of the tooth-on-tooth position at the interlocking shifting element should take place as quickly as possible, and on the other hand it should take place as comfortably as possible, granted that an elimination of a tooth-on-tooth position at an interlocking shifting element is the more comfortable, the less the drive-train is affected by knocks.

From DE 10 2006 046 605 A1 a method for eliminating a tooth-on-tooth position at an interlocking shifting element of a transmission is known, in which prior art the tooth-on-tooth position at an interlocking shifting element can be eliminated by using a driving clutch or transmission brake as the actuator.

From EP 1 572 491 B1 another method for eliminating a tooth-on-tooth position at an interlocking shifting element of a transmission is known, in which prior art, to eliminate the tooth-on-tooth position a clutch is regulated selectively and during this it is checked whether the tooth-on-tooth position has actually been eliminated. If after an operating attempt a tooth-on-tooth position cannot be eliminated, then in a subsequent operating attempt a target parameter of the clutch is increased in order to eliminate the tooth-on-tooth position in the next operating attempt.

From DE 10 2005 012 308 A1 a further method for eliminating a tooth-on-tooth position at an interlocking shifting element is known, such that in this method too an actuator is operated with a defined target parameter to eliminate the tooth-on-tooth position at the interlocking shifting element. In this case the target parameter is a clutch position, which is adapted as a function of a reaction signal from a transmission.

SUMMARY OF THE INVENTION

Starting from there, the purpose of the present invention is to provide a new type of method for eliminating a tooth-on-tooth position as well as a control device for implementing the method.

This objective is achieved by a method for the elimination of a tooth-on-tooth position according to the invention. An existing tooth-on-tooth position is eliminated by operating at least one actuator in such manner that in a first operating attempt the actuator is operated with a defined target parameter, it is then checked whether, as a result of that operation of the actuator, the existing tooth-on-tooth position has been eliminated, and if it is found that the existing tooth-on-tooth position has not been eliminated, then in one or more subsequent operating attempts the operation of the actuator is repeated, each time with an increased target parameter, as often as necessary for the existing tooth-on-tooth position to be eliminated at the m-th operating attempt, and for the elimination of a subsequent tooth-on-tooth position, the target parameter defined for the first operating attempt is adapted in such manner that the subsequent tooth-on-tooth position is eliminated as necessary at an n-th operating attempt.

The method according to the invention enables tooth-on-tooth positions to be eliminated in a particularly advantageous manner. When an existing tooth-on-tooth position has been eliminated, then for the elimination of a subsequent tooth-on-tooth position the target parameter for the first operating attempt is adapted for the elimination of the next tooth-on-tooth position, namely in such manner that the next tooth-on-tooth position is eliminated as necessary or according to plan at the n-th, $n>1$, operating attempt, preferably at the second operating attempt. This can ensure that a tooth-on-tooth position is eliminated on the one hand as quickly, and on the other hand as comfortably, as possible.

If it is found that the initially existing tooth-on-tooth position has not been eliminated, then to eliminate the existing tooth-on-tooth position the target parameter for the respective next operating attempt is in each case increased by a defined, preferably always equal increment. If when the initially existing tooth-on-tooth position is eliminated $m>n$, $n>1$, then as the target parameter defined for the first operating attempt to eliminate a subsequent tooth-on-tooth position, that target parameter is used which was used for the $(m-n+1)$-th operating attempt to eliminate the initially existing tooth-on-tooth position. If when the initially existing tooth-on-tooth position is eliminated $m<n$, $n>1$, in particular when the tooth-on-tooth position was eliminated already at the first operating attempt, then to eliminate a subsequent tooth-on-tooth position the target parameter defined for the first operating attempt is adapted in such manner that the target parameter of the m-th operating attempt used for eliminating the initially existing tooth-on-tooth position is reduced, specifically by $(n-1)$ increments. If when the initially existing tooth-on-tooth position is eliminated $m=n$, $n>1$, then as the target parameter defined for the first operating attempt to eliminate the subsequent tooth-on-tooth position, the target parameter defined for the first operating attempt to eliminate the initially existing tooth-on-tooth position is used. This procedure for eliminating the initially existing tooth-on-tooth position and for adapting the target parameter defined for the first operating attempt to eliminate the next tooth-on-tooth position is simple, reliable, and offers a good compromise between an elimination of a tooth-on-tooth position which is as quick as possible and as comfortable as possible.

If a difference $m-n$ is larger than a limit value x, the adaptation carried out is limited in such manner that $n=m-x$, so that the next tooth-on-tooth position is eliminated as necessary at the $(m-x)$-th operating attempt. This limiting of the adaptation can further improve the compromise between eliminating a tooth-on-tooth position at an interlocking shifting element as quickly as possible and as comfortably as possible.

When n=2, i.e. when the tooth-on-tooth position has been eliminated as necessary at the second operating attempt, then in the case when m>2 for the elimination of the existing tooth-on-tooth position, as the target parameter defined for the first operating attempt to eliminate the next tooth-on-tooth position that target parameter is used, which was used for the operating attempt immediately prior to the successful operating attempt, i.e. the (m−1)-th operating attempt. If n=2 and m=1 when the initially existing tooth-on-tooth position was eliminated, then as the target parameter for the first operating attempt to eliminate the next tooth-on-tooth position, the target parameter for the first operating attempt to eliminate the initially existing tooth-on-tooth position is reduced by a single increment. If n=2 and m=2 when the initially existing tooth-on-tooth position is eliminated, then as the target parameter defined for the first operating attempt to eliminate the next tooth-on-tooth position, the target parameter defined for the first operating attempt to eliminate the initially existing tooth-on-tooth position is used.

Preferably, the number n of the operating attempt when a tooth-on-tooth position should be eliminated as necessary or according to plan, is stored in a control device.

BRIEF DESCRIPTION OF THE DRAWINGS

Preferred further developments of the invention emerge from the description given below. Example embodiments of the invention, to which it is not limited, are explained with reference to the sole drawing, which shows a diagram of a drive-train having a control unit according to the invention.

DETAILED DESCRIPTION OF THE PREFERRED EMBODIMENTS

The present invention concerns a control unit, in particular a transmission control unit in a motor vehicle, and a method for eliminating a tooth-on-tooth position at an interlocking shifting element, in particular a transmission-internal interlocking shifting element of an automated change-speed transmission or an interlocking shifting element connected between two gear systems.

FIG. 1 shows a very schematic representation of a drive-train of a motor vehicle, having a drive aggregate 1 and a transmission 3 connected between the drive aggregate 1 and a drive output 2. The transmission 3 converts rotation speeds and torques so as to transmit the traction force produced by the drive aggregate 1 to the drive output 2. In the example embodiment shown, the drive aggregate 1 comprises an internal combustion engine 4 and an electric machine 5, and is therefore in the form of a hybrid drive unit.

Already at this point it should be mentioned that the invention is not limited to use in a hybrid vehicle. Rather, it can also be used with other drive-trains.

The transmission 3 connected between the drive aggregate 1 and the drive output 4 is an automated change-speed transmission comprising a number of interlocking shifting elements 6. Between the internal combustion engine 4 and the electric machine 5 of the drive aggregate 1 is connected a driving clutch 7, which is open when the internal combustion engine 4 is decoupled from the drive output 2 but closed when the internal combustion engine 4 is coupled to the drive output 2. Such a drive-train is also referred to as a parallel-hybrid drive-train. In addition, FIG. 1 shows that the drive-train has a transmission brake 8 on the transmission input side, and a service brake 9.

Associated with the drive aggregate 1 is an engine control unit 10 for controlling and/or regulating the operation of the drive aggregate 1. As indicated in FIG. 1 by the broken-line arrows, for that purpose the engine control unit 10 exchanges data with the drive aggregate 1, in particular with the internal combustion engine 4 and the electric machine 5, and also in this example layout, with the clutch 7 connected between them.

The operation of the transmission 3 is controlled and/or regulated by a transmission control unit 11, and again as indicated in FIG. 1 by broken-line arrows, for this purpose the transmission control unit 11 exchanges data on the one hand with the transmission 3 and on the other hand with the engine control unit 10. In addition, as shown in FIG. 1 the transmission control unit 11 exchanges data with the transmission brake 8 and the service brake 9.

When a gearshift or shifting operation is carried out in the automated change-speed transmission 3 in FIG. 1, a tooth-on-tooth position may occur at an interlocking shifting element of the transmission and this has to be eliminated.

The elimination of such a tooth-on-tooth position involves at least one actuator, for which the transmission control unit 11 determines a corresponding operating signal which it sends to the actuator concerned either directly or indirectly by way of some other control device. Possible actuators for eliminating such a tooth-on-tooth position may be in particular the internal combustion engine 4 and/or the electric machine 5 and/or the driving clutch 7 and/or the transmission brake 8.

When a tooth-on-tooth position occurs at an interlocking shifting element 6 of the transmission 3, the existing tooth-on-tooth position is eliminated by operating at least one actuator, in particular the driving clutch 7, in such manner that in a first operating attempt the actuator, in particular the driving clutch 7, is operated using a defined target parameter.

The target parameter used when operating the driving clutch 7 can be a defined clutch travel path or a defined clutch torque to be transmitted by the clutch.

After this first attempt it is checked whether as a result of the actuator operation using the defined target parameter, the tooth-on-tooth position existing at the interlocking shifting element 6 has been eliminated.

If it is found that the existing tooth-on-tooth position has not in fact been eliminated, then in one or more subsequent operating attempts the operation of the actuator, in particular the driving clutch 7, is repeated, in each case with an increased target parameter, as often as necessary for the initially existing tooth-on-tooth position actually to be eliminated as a result of the operation of the actuator, in particular the driving clutch 7, this elimination taking place at the m-th attempt. When it is found that the initially existing tooth-on-tooth position has not been eliminated at the first attempt, then for the respective subsequent operating attempts of the actuator the target parameter is preferably increased in each case by a fixed increment, namely in the case of a driving clutch 7 by a fixed clutch travel path or by a fixed clutch torque increment. The number m of operating attempts required to eliminate the initially existing tooth-on-tooth position is counted.

For the elimination of a later tooth-on-tooth position, the target parameter defined for the actuator's operation in the first operating attempt to eliminated the later tooth-on-tooth position is adapted in such manner that this later tooth-on-tooth position is eliminated as necessary or according to plan at the n-th (n>1) operating attempt, preferably at the second (n=2) attempt. The target number n of the operating attempt after which a tooth-on-tooth position should be eliminated as necessary or according to plan, is stored in a control device.

The values of n and m are in each case positive integers.

If m>n (n>1), as the target parameter defined for the first operating attempt to eliminate the next tooth-on-tooth position, that target parameter is used which was used for eliminating the initially existing tooth-on-tooth position at the (m−n+1)-th attempt.

If m>n and n=2, i.e. if the next tooth-on-tooth position is eliminated as necessary or according to plan at the second operating attempt, then as the target parameter defined for the first operating attempt to eliminate the following tooth-on-tooth position, that target parameter is used which was used for the operating attempt carried out immediately before the successful attempt to eliminate the existing tooth-on-tooth position, i.e. the target parameter for the (m−1)-th attempt to eliminate the existing tooth-on-tooth position.

If m<n (n>1), in particular when the tooth-on-tooth position has already been eliminated by the first operating attempt, then to eliminate a subsequent tooth-on-tooth position the target parameter defined for the first attempt is adapted in such manner that the target parameter of the m-th attempt is reduced, specifically by (n−1) increments.

If m=1 and n=2, i.e. if the subsequent tooth-on-tooth position is eliminated as necessary or according to plan at the second operating attempt and the initially existing tooth-on-tooth position was eliminated already at the first attempt, then to eliminate the following tooth-on-tooth position the target parameter used for the first operating attempt which eliminated the initially existing tooth-on-tooth position is reduced by a single increment.

In a first example embodiment it will be assumed that to eliminate a tooth-on-tooth position at an interlocking shifting element 6 as necessary, n=2 operating attempts for the driving clutch 7 have to be made, and that to eliminate a tooth-on-tooth position the driving clutch 7 is operated, in a first operating attempt, with a defined target parameter, namely with a target clutch torque of 50 Nm, and the defined clutch torque increment is 10 Nm. In addition let it be assumed that the initially existing tooth-on-tooth position could not be eliminated until the fifth attempt (m=5), i.e. after the target parameter had been increased by four increments up to 90 Nm. Thus, to eliminate a subsequent tooth-on-tooth position the target parameter defined for the first attempt is adapted to 80 Nm, i.e. to the target parameter used for the fourth operating attempt (m−n+1; m=5; n=2), so that the subsequent tooth-on-tooth position is eliminated as necessary at the second attempt (n=2).

In this first example embodiment, if the subsequent tooth-on-tooth position can already be eliminated using the target parameter of 80 Nm and therefore at the first operating attempt, then for a further subsequent tooth-on-tooth position the target parameter defined for the first attempt is reduced by a single increment (n−1; n=2), i.e. to 70 Nm.

In the first example embodiment, if the subsequent tooth-on-tooth position can be eliminated as necessary using the target parameter of 90 Nm and hence at the second operating attempt, then for a further subsequent tooth-on-tooth position the target parameter defined for the first attempt is left unchanged.

In a second example embodiment it is assumed that to eliminate a tooth-on-tooth position as necessary at an interlocking shifting element 6, n=3 operating attempts for the driving clutch 7 have to be made, and to eliminate a tooth-on-tooth position at an interlocking shifting element 6 of the transmission 3 the driving clutch 7 is operated in a first operating attempt using a defined target parameter, namely a target clutch torque of 50 Nm, and the defined clutch torque increment is 5 Nm. In addition let it be assumed that the initially existing tooth-on-tooth position was only eliminated at the sixth operating attempt (m=6), i.e. after five incremental increases of the target parameter up to 75 Nm. According to this, to eliminate a subsequent tooth-on-tooth position the target parameter for the first attempt is adapted to 65 Nm, i.e. to the target parameter for the fourth operating attempt (m−n+1; m=6; n=3), so that the subsequent tooth-on-tooth position is eliminated as necessary at the third attempt (n=3).

In this second example embodiment, if the subsequent tooth-on-tooth position can be eliminated already using the target parameter of 65 Nm and hence at the first attempt, then for a further subsequent tooth-on-tooth position the target parameter defined for the first operating attempt is reduced by two increments (n−1; n=3), i.e. to 55 Nm, in such manner that therefore the further subsequent tooth-on-tooth position is eliminated as necessary at the third attempt (n=3).

In the second example embodiment, if the subsequent tooth-on-tooth position can already be eliminated with the target parameter of 70 Nm and hence at the second operating attempt, then for a further subsequent tooth-on-tooth position the target parameter defined for the first operating attempt is also reduced by two increments (n−1; n=3), i.e. to 60 Nm, i.e. in such manner that the further subsequent tooth-on-tooth position is eliminated as necessary at the third attempt (n=3).

In the second example embodiment, if the subsequent tooth-on-tooth position can be eliminated using the target parameter of 75 Nm and thus as required at the third attempt, then for a further subsequent tooth-on-tooth position the target parameter defined for the first operating attempt is left unchanged at 65 Nm, so that the further subsequent tooth-on-tooth position is eliminated at the third attempt (n=3).

Thus, in the context of the present invention a target parameter for the operation of an actuator that serves to eliminate a tooth-on-tooth position at an interlocking shifting element is adapted in such manner that the tooth-on-tooth position at the interlocking shifting element is eliminated at the n-th, preferably at the second operating attempt. This offers an optimum compromise between eliminating a tooth-on-tooth position at an interlocking shifting element 6 as comfortably as possible and on the other hand as quickly as possible.

In a further development of the invention it can be provided that the above adaptation is limited.

If the difference m−n is smaller than or equal to a limit value x, the adaptation is not limited. In this case to eliminate a subsequent tooth-on-tooth position the target parameter defined for the first operating attempt is adapted in such manner that the subsequent tooth-on-tooth position is eliminated as necessary at the n-th attempt, where n corresponds to the value stored in the control unit.

On the other hand, if the difference m−n is larger than the limit value x, the adaptation is limited. In such a case, to eliminate a subsequent tooth-on-tooth position the target parameter defined for the first attempt is adapted in such manner that the subsequent tooth-on-tooth position is eliminated as necessary at the n-th attempt, where n does not correspond to the value stored in the control unit, but instead n=m−x. The value x is also stored in the control unit.

The values of n, m and x are in each case positive integers.

In the above, first example embodiment in which the value 2 is stored for n and in which the tooth-on-tooth position is not eliminated until the fifth attempt, this means that when x=2 and m−n>x, then for the elimination of a subsequent tooth-on-tooth position the target parameter defined for the first operating attempt is adapted to 70 Nm, i.e. to the target parameter used for the third operating attempt (n=m−x, m=5, x=2), so that instead the subsequent tooth-on-tooth position is eliminated at the third attempt (n=m−x=3).

The invention also concerns a preferably electronic control unit, in particular a transmission control unit 11, having means for implementing the method. The means consist of data interfaces, a processor and a memory, By way of the data interfaces, data can be exchanged with the assemblies involved in implementing the method. The processor serves for data processing and the memory serves for data storage.

INDEXES

1 Drive aggregate
2 Drive output
3 Transmission
4 Internal combustion engine
5 Electric machine
6 Interlocking shifting element
7 Driving clutch
8 Transmission brake
9 Service brake
10 Engine control unit
11 Transmission control unit

The invention claimed is:

1. A method of eliminating a tooth-on-tooth position at an interlocking shifting element, the method comprising the steps of:
    eliminating the tooth-on-tooth position by operating at least one actuator in such manner that, during a first operating attempt, the actuator is operated using a defined target parameter;
    checking, after the first operating attempt, whether as a result of actuator operation the tooth-on-tooth position is eliminated;
    if the tooth-on-tooth position is not eliminated, repeating the operation of the actuator during one or more subsequent operating attempts, and during each of the one or more subsequent operating attempts, operating the actuator using an increased target parameter until, after a corresponding operation of the actuator, the tooth-on-tooth position is eliminated at an m-th operating attempt; and
    eliminating a subsequent tooth-on-tooth position by adapting the defined target parameter, for a first elimination attempt, in such manner that the subsequent tooth-on-tooth position is eliminated at an n-th attempt.

2. The method according to claim 1, further comprising the step of if it is found that the tooth-on-tooth position is not eliminated after an operating attempt, then increasing the target parameter, in each case, by a defined increment for the respective one or more subsequent operating attempts.

3. The method according to claim 1, further comprising the step of if m>n, n>1, then using that target parameter, which was used for the (m−n+1)-th attempt, as the target parameter of the first attempt to eliminate a next tooth-on-tooth position.

4. The method according to claim 3, further comprising the step of adapting the target parameter defined for the first operating attempt, for elimination of a subsequent tooth-on-tooth position, in such manner that the subsequent tooth-on-tooth position is eliminated by a second operating attempt, and as the target parameter defined for a first operating attempt to eliminate the subsequent tooth-on-tooth position, the target parameter used is that target parameter which was used for the operating attempt made immediately before a successful operating attempt.

5. The method according to claim 3, further comprising the step of if a difference m−n is larger than a limit value x, then limiting the adaptation such that n=m−x, so that then the next tooth-on-tooth position is eliminated at the (m−x)-th attempt.

6. The method according to claim 1, further comprising the step of if m<n, n>1, and if the tooth-on-tooth position is eliminated by the first operating attempt, adapting the target parameter defined for the first operating attempt such that the target parameter of the m-th operating attempt is reduced for the elimination of a subsequent tooth-on-tooth position.

7. The method according to claim 6, further comprising the step of reducing the target parameter for the m-th operating attempt by (n−1) increments to determine the target parameter defined for the first operating attempt to eliminate the subsequent tooth-on-tooth position.

8. The method according to claim 6, further comprising the step of adapting the target parameter defined for the first operating attempt, to eliminate a subsequent tooth-on-tooth position, such that the subsequent tooth-on-tooth position is eliminated by the second operating attempt, so that if the tooth-on-tooth position is already eliminated by the first operating attempt, as the target parameter defined for the first operating attempt to eliminate the subsequent tooth-on-tooth position, the target parameter for the first operating attempt is reduced by a single increment.

9. The method according to claim 1, further comprising the step of if m=n, n>1, using the target parameter for the first operating attempt as the target parameter defined for the first operating attempt to eliminate a subsequent tooth-on-tooth position.

10. The method according to claim 1, further comprising the step of storing the number n in a control unit.

11. A control unit of a transmission of a motor vehicle, wherein the control unit comprises means for implementing a method for eliminating a tooth-on-tooth position at an interlocking shifting element having the steps of eliminating the tooth-on-tooth position by operating at least one actuator in such manner that during a first operating attempt the actuator is operated using a defined target parameter; checking, after the first operating attempt, whether as a result of the actuator operation the tooth-on-tooth position is eliminated; if the tooth-on-tooth position is not eliminated, repeating the operation of the actuator in one or more subsequent operating attempts, in each of the one or more subsequent operating attempts the actuator is operated using an increased target parameter, until, after a corresponding operation of the actuator, the tooth-on-tooth position is eliminated by an m-th operating attempt; and eliminating a subsequent tooth-on-tooth position, by adapting the defined target parameter for the first operating attempt in such manner that the subsequent tooth-on-tooth position is eliminated at an n-th operating attempt.

12. A method of eliminating tooth-on-tooth positions at an interlocking shifting element, the method comprising the steps of:
    operating an actuator using a defined target parameter during a first operating attempt to eliminate an initial tooth-on-tooth position;
    determining whether the initial tooth-on-tooth position, of the interlocking shifting element, was eliminated by operating the actuator during the first attempt to eliminate the initial tooth-on-tooth position;
    if it is determined that the initial tooth-on-tooth position is not eliminated, increasing the target parameter and operating the actuator using the increased target parameter in at least one further operating attempt to eliminate the initial tooth-on-tooth position;
    determining whether the initial tooth-on-tooth position at the interlocking shifting element was eliminated during the at least one further attempt to eliminate the initial tooth-on-tooth position;

repeating the at least one further attempt to eliminate the initial tooth-on-tooth position until the initial tooth-on-tooth position is eliminated by an m-th further operating attempt to eliminate the initial tooth-on-tooth position; and adapting the defined target parameter and operating the actuator using the adapted target parameter to eliminate a subsequent tooth-on-tooth position during an n-th operating attempt to eliminate the subsequent tooth-on-tooth position.

* * * * *